US012272873B2

(12) United States Patent
Kähkönen et al.

(10) Patent No.: US 12,272,873 B2
(45) Date of Patent: Apr. 8, 2025

(54) ANTENNA ARRAY

(71) Applicant: SAAB AB, Linköping (SE)

(72) Inventors: Henri Kähkönen, Tampere (FI); Juha Ala-Laurinaho, Espoo (FI); Ville Viikari, Espoo (FI)

(73) Assignee: SAAB AB, Linköping (SE)

( * ) Notice: Subject to any disclaimer, the term of this patent is extended or adjusted under 35 U.S.C. 154(b) by 126 days.

(21) Appl. No.: 18/041,810

(22) PCT Filed: Aug. 19, 2021

(86) PCT No.: PCT/SE2021/050815
§ 371 (c)(1),
(2) Date: Feb. 16, 2023

(87) PCT Pub. No.: WO2022/045946
PCT Pub. Date: Mar. 3, 2022

(65) Prior Publication Data

US 2024/0014566 A1 Jan. 11, 2024

(30) Foreign Application Priority Data

Aug. 25, 2020 (SE) .................................... 2000147-5

(51) Int. Cl.
*H01Q 21/06* (2006.01)
*H01Q 13/08* (2006.01)

(52) U.S. Cl.
CPC ......... *H01Q 13/085* (2013.01); *H01Q 21/064* (2013.01)

(58) Field of Classification Search
CPC .... H01Q 21/064; H01Q 13/085; H01Q 21/00; H01Q 21/293
See application file for complete search history.

(56) References Cited

U.S. PATENT DOCUMENTS 7,106,268 B1 * 9/2006 Angelucci .............. H01Q 13/08 343/770
9,270,027 B2 * 2/2016 Waschenko ........ H01Q 21/0087
10,320,075 B2 6/2019 Sanchez
2002/0180655 A1 12/2002 Mohuchy et al.
2013/0214980 A1 8/2013 Lambert et al.
2017/0256848 A1 9/2017 Mcgrath
(Continued)

OTHER PUBLICATIONS

Extended European Search Report mailed Jul. 19, 2024 for European Patent Application No. 21862192.8, 11 pages.
(Continued)

*Primary Examiner* — Hasan Islam
(74) *Attorney, Agent, or Firm* — Sage Patent Group

(57) ABSTRACT

The present disclosure relates to an antenna array including an integral antenna element structure mounted on a substrate. The integral antenna element structure includes a first set of antenna elements and a second set of antenna elements. Each antenna element including a first body and an adjacent second body. The second body is branched into a first leg and a second leg, wherein a transition pin forms an integral part with said first leg. The first set, and second sets of antenna elements are arranged such that the first body and the second body of each adjacent antenna element form a common tapered structure.

16 Claims, 9 Drawing Sheets

(56) References Cited

U.S. PATENT DOCUMENTS

2017/0331199 A1 11/2017 Svensson

OTHER PUBLICATIONS

Massman, Jeffrey et al.; "Low Cost Additively Manufactured Antenna Array Modules"; 2019 IEEE International Symposium on Phased Array System and Technology; Oct. 15, 2019; 4 pages.

International Search Report and Written Opinion mailed Sep. 1, 2021 for International Application No. PCT/SE2021/050815, 11 pages.

* cited by examiner

ANTENNA ARRAY

CROSS-REFERENCE TO RELATED APPLICATIONS

This application is a 35 U.S.C § 371 national stage application for International Application No. PCT/SE2021/050815, entitled "AN ANTENNA ARRAY", filed on Aug. 19, 2021, which claims priority to Swedish Patent Publication No. 2000147-5, filed on Aug. 25, 2020, the disclosures and contents of which are hereby incorporated by reference in their entireties.

TECHNICAL FIELD

The present disclosure relates to an antenna array comprising an integral antenna element structure mounted on a substrate. The disclosure further relates to a method for manufacturing an antenna array.

BACKGROUND

Antennas are known in the art and used to convert radio frequency fields into alternating current or converting alternating current in to propagating waves at radio frequencies. Antenna arrays with a set of two or more antenna elements are commonly used in various applications to combine or process signals from the antenna array in order to achieve improved performance over that of a single antenna. For instance, they are able to match a radiation pattern to a desired coverage area, changing radiation pattern, adapting to changing signal conditions and some configurations can cover a large bandwidth. Antenna arrays can be described by their radiation patterns and by the type of antenna elements in the system.

A common type of antenna array is the Vivaldi antenna array, also known as a tapered-slot or flared-notch antenna array. Conventionally, the Vivaldi antenna array typically have a radiating part starting with a slot-line which widens in one direction in a tapered notch. The Vivaldi antenna array is usually designed such that each Vivaldi element is fed through a separate radio frequency (RF) connector. This type of design can be applied for frequencies up to 21 GHz. However, for higher frequencies, such as frequencies above 21 GHz, the inter-element distance of the antenna array decreases resulting in that the RF connectors below each antenna element are of a larger size than the antenna elements. This can result in that the RF connector can limit the inter-element distance between the antenna elements and the electronics in an antenna array. Interelement distance larger than half wavelength may result into emergence of grating lobes, depending on the beam steering direction.

Consequently, at higher frequencies, the Vivaldi antenna array will be increasingly complex to manufacture. Also, connectors designed for higher frequencies are more expensive than RF connectors adapted for lower frequencies. This results in that the cost of manufacturing and assembly of an antenna array adapted for higher frequencies would become significant, especially for Vivaldi antenna arrays having a large amount of antenna elements.

Thus, there is room for Vivaldi antenna arrays in the present art to explore the domain of providing an improved Vivaldi antenna array with simplicity in design, assembly and manufacturing compared to previous solutions. More specifically, there is a need in the present art for an improved Vivaldi antenna array for higher frequencies being cost-efficient and having simplified manufacturing and assembly.

Even though some currently known solutions work well in some situations it would be desirable to provide an antenna array that fulfils requirements related to improving the cost-efficiency, assembly and manufacturing of Vivaldi antenna arrays.

SUMMARY

It is therefore an object of the present disclosure to provide an antenna array, a method for manufacturing an antenna array, a base station and a vehicle comprising such an antenna array to mitigate, alleviate or eliminate one or more of the above-identified deficiencies and disadvantages.

This object is achieved by means of an antenna array, a method for manufacturing an antenna array, a vehicle and a base station comprising such an antenna array as defined in the appended claims.

The present disclosure is at least partly based on the insight that by providing an antenna array having an integral antenna element structure where the antenna elements, the antenna ground plane and the transition pin are all integral made in one piece, several advantages in terms of cost effectiveness, manufacturing, electrical and thermal properties, and assembly are readily available. In accordance with the disclosure there is provided an antenna array according to claim 1 and a method for manufacturing an antenna array according to claim 15.

The present disclosure provides an antenna array comprising an integral antenna element structure mounted on a substrate. The integral antenna element structure comprises an antenna ground plane having first and second opposing surfaces. The integral antenna element structure further comprises a first set of antenna elements arranged in at least a first and a second row and a second set of antenna elements arranged in at least a first and a second column. The antenna elements extend vertically from the first surface of the antenna ground plane. Each antenna element comprises a first body and an adjacent second body extending from a lower portion to a tapered upper portion forming a radiation-slot intermediate the tapered upper portion of the first and the second body. Further, a first end of the lower portion of the first body forms a common integral part with the first surface of the antenna ground plane and the lower portion of the second body is branched into a first leg and a second leg having a first leg end and a second leg end. Furthermore, a transition pin forms an integral part with said first leg, extending from said first leg end at least partly through a passage in said ground plane, the second leg end being integral with the first surface of the antenna ground plane. The first set of antenna elements are arranged such that the first body and the second body of each adjacent antenna element form a common tapered structure, and the second set of antenna elements are arranged such that the first body and the second body of each adjacent antenna element form a common tapered structure.

A benefit of the antenna array is that the antenna element structure is integral and forms a single piece that comprises a transition pin, a ground plane and antenna elements. Thus, the manufacturing and the assembly of the antenna array is simplified. The antenna array can be manufactured and assembled by mounting two pieces together i.e. the antenna element structure and the substrate. Further, since the antenna array comprises a transition pin instead of a connector, the antenna array is applicable to Ka-band and mmWave frequencies in a more convenient manner compared to previous solutions that comprise separate connectors behind each antenna element. If previous solutions are to be directed to frequencies above 18 GHz, the connector may have a size larger than the antenna elements, limiting the interelement distance, which may lead to larger than half-wave separation between adjacent elements which further may lead to grating lobes. By providing an antenna array with an integral transition pin instead of a connector, the above deficiencies are resolved and other benefits such as reduced weight is provided. Also, the transition pin is cheaper than a connector. Furthermore, the antenna array according to the present disclosure results in a more compact structure compared to previous solutions.

The integral structure described may also lead into better electrical and thermal performance. Separate connectors and cables are typically lossy. Additional losses between the antenna element and transceiver increases power consumption, decreases efficiency, decreases the sensitivity and output power. The transceiver can be in the immediate vicinity of the antenna element in the described solution. This structure minimizes RF losses between the antenna and the transceiver.

Active electronics, especially power amplifiers generate significant amount of heat during operation. To avoid overheating, excess heat must be dissipated. In the integral solution described above, the antenna block is mechanically connected to the printed circuit board, where active electronics is integrated. The antenna block can be fabricated from metal, which is known to be a good thermal conductor. This metal structure may have a good thermal connection to the printed circuit board due to a large contact area and the structure can conduct heat away from active electronics. The legs of the antenna array operate inherently as thermal radiators and cools the structure.

The antenna array according to the present disclosure may be a Vivaldi antenna array or a flared-notch antenna array or a tapered slot antenna array.

The first body and the second body of a common tapered structure of the first set of elements may be perpendicularly conjoined with a corresponding common tapered structure of the second set of elements. Consequently, a common tapered structure of the first set of elements and a corresponding common tapered structure of the second set of elements may form a cross, such that the antenna elements form a grid-like structure on said first surface. This type of structure allows for the antenna array to achieve an even more compact structure.

Further, the first body and the second body may comprise an inner portion and an outer portion, the outer portion extending vertically. Also, the radiation-slot may extend into a sinuous portion towards the first surface of the antenna ground plane.

The sinuous portion may extend into the passage of the ground plane. This structure allows for a simplified structure of the antenna array allowing for even further simplified manufacturing. Since the sinuous portion extends into the passage, it may form a part of the passage allowing the sinuous portion and the passage to be formed at least partly simultaneously during manufacturing of the antenna array.

Further, a cavity may be formed intermediate the first leg and the second leg of the second body. The cavity may extend vertically from the first surface of the antenna ground plane in a tapered manner, forming an arrow-like shape.

Further, the substrate may comprise an electrically conductive pattern, wherein a first surface of said substrate comprises a plurality of feeding pads, each feeding pad being arranged to feed a corresponding transition pin. A benefit of this is that the antenna element structure may be mounted directly to the substrate. Further, such a substrate is convenient to adapt to a corresponding antenna element structure.

The substrate may comprise at least one vertical interconnect access, via arranged to transfer a signal to the feeding pad from a layer below the first surface of the substrate. Allowing the volume of the substrate to be utilized to a large extent. The substrate may be a printed circuit board, PCB.

The antenna array may be configured to transmit and receive wireless signals at a frequency in the range of 21 GHz and 50 GHz. By having a transition pin instead of a connector, higher frequencies such as frequencies in the range of 21 GHz and 50 GHz are achievable without hampering the performance of the antenna array.

The integral antenna array structure may be a metal structure. By having a metal structure combined with the design of the integral antenna element structure the antenna element structure may beneficially draw excess heat from the substrate. Accordingly, the risk of overheating of the antenna array and its electronics is decreased. Electronics may be e.g. amplifiers, phase shifters, vector modulators etc.

The passage may circumferentially enclose the transition pin. This allows for a more stable structure and reduces the risk of having the transition pin to be bent or damaged.

There is also disclosed a vehicle comprising the antenna array as disclosed herein. Further, there is also disclosed a base station comprising the antenna array according to the present disclosure.

Furthermore, there is disclosed a method for manufacturing an antenna array comprising the steps of;

- forming an integral antenna element structure. The antenna element structure comprises an antenna ground plane having first and second opposing surfaces. Further comprising a first set of antenna elements arranged in at least a first and a second row, and a second set of antenna elements arranged in at least a first and a second column, the antenna elements extending vertically from said first surface. Each antenna element comprising a first body and an adjacent second body extending from a lower portion to a tapered upper portion, forming a radiation-slot intermediate the tapered upper portion of the first and the second body. The first end of the lower portion of the first body form a common integral part with the first surface of the antenna ground plane, and the lower portion of the second body is branched into a first leg and a second leg having a first leg end and a second leg end. Further, a transition pin forms an integral part with said first leg, extending from said first leg end at least partly through a passage in said ground plane, the second leg end being integral with the first surface of the antenna ground plane. The first set of antenna elements are arranged such that the first body and the second body of each adjacent antenna element form a common tapered structure and the second set of antenna elements are arranged such that the first body and the second body of each adjacent antenna element form a common tapered structure.
- mounting the integral antenna element structure to a substrate.

A benefit of the method is that it only requires two major steps, forming the antenna element structure and mounting the antenna element structure to a substrate. Since the antenna ground plane, the transition pin and the elements are all integral with the antenna element structure the time of manufacturing the antenna array is significantly reduced and simplified.

The integral antenna element structure may be formed by additive manufacturing or machining.

The integral antenna element may be mounted on said substrate by soldering, glue or screws.

BRIEF DESCRIPTION OF THE DRAWINGS

Further objects, features and advantages of embodiments of the disclosure will appear from the following detailed description, reference being made to the accompanying drawings, in which.

DETAILED DESCRIPTION

Figure 1:
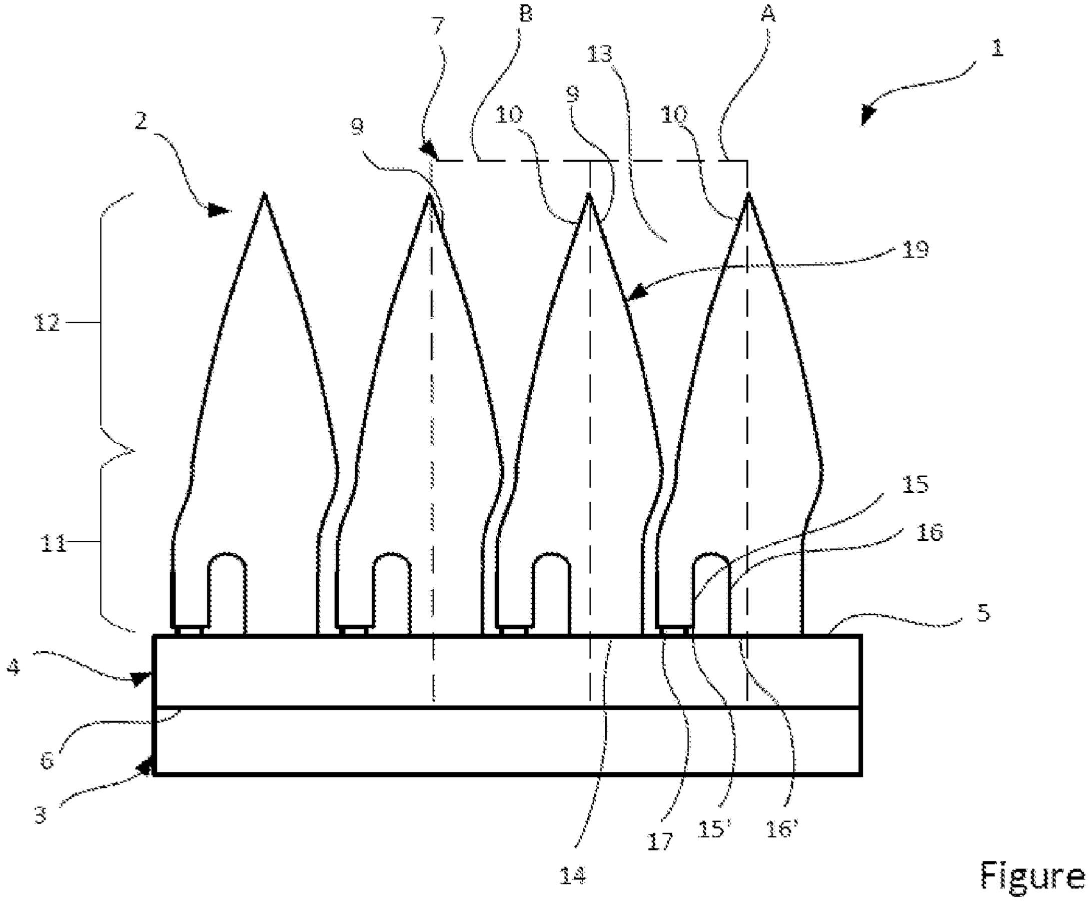
FIG. 1 depicts a side-view of an antenna array in accordance with an embodiment of the present disclosure.

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided antenna array, method for manufacturing an antenna array, a base station and a vehicle comprising such an antenna array, it will be apparent to one skilled in the art that the antenna array and the method for manufacturing the antenna array may be realized without these details. In other instances, well known constructions or functions are not described in detail, so as not to obscure the present disclosure.

In the following description of example embodiments, the same reference numerals denote the same or similar components.

The term “array antenna” or “array of antenna elements” or “antenna array” refers to a set of multiple connected antennas which work together as a single antenna. In this disclosure the term “antenna array” refers to at least two antenna elements. The term “RF” refers to radio frequency which is an electromagnetic wave having a frequency. An antenna array may be coupled to a feeding system.

The term “connector” or “RF connector” refers to a separate component which may for example connect coaxial cables, which transmit radio frequency signals between at least two points.

The term “radiation slot” refers to a cavity within the antenna element that guides electromagnetic waves from the cavity to be emitted from the antenna element. The cavity may be filled with air.

The term “substrate” refers to a non-conductive or dielectric substrate that may comprise electrically conductive patterns such as electrically conductive tracks. A substrate may further comprise vias and pads, laminated on, under or between different layers of the substrate. It may further comprise electrical components such as amplifiersb switches and DC circuitry.

The term “integral” refers to a unitary or one-piece structure made of a single material and does not include structures formed by e.g. welding, soldering or gluing several pieces together. Thus, the term “integral antenna element structure” refers to that the antenna element structure is a monolithic structure. Accordingly, the term “integral” may be interchanged with the term “monolithic”.

FIG. 1 illustrates a side view of an antenna array 1 comprising; an integral antenna element structure 2 mounted on a substrate 3. The integral antenna element structure 2 comprises an antenna ground plane 4 having first and second opposing surfaces 5, 6, a first set of antenna elements 7 arranged in at least a first and a second row (not shown, see FIGS. 2-3), and a second set of antenna elements 7 arranged in at least a first and a second column (not shown, see FIGS. 2-3), said antenna elements 7 extending vertically from said first surface 5. Each antenna element 7 comprises a first body 9 and an adjacent second body 10 extending from a lower portion 11 to a tapered upper portion 12, forming a radiation-slot 13 intermediate the tapered upper portion 12 of the first and the second body 9, 10. A first end 14 of the lower portion 11 of the first body 9 form a common integral part with the first surface 5 of the antenna ground plane 4, wherein the lower portion 11 of the second body 10 is branched into a first leg 15 and a second leg 16 having a first leg end 15' and a second leg end 16', Further, a transition pin 17 forms an integral part with said first leg 15, extending from said first leg end 15' at least partly through a passage (not shown, see ref. 18 in FIG. 4) in said ground plane 4, the second leg end 16' being integral with the first surface 5 of the antenna ground plane 4. The first set of antenna elements 7 are arranged such that the first body 9 and the second body 10 of each adjacent antenna element 7 form a common tapered structure 19. The second set of antenna elements 7 are arranged such that the first body 9 and the second body 10 of each adjacent antenna element 7 form a common tapered structure 19.

The antenna array 1 as shown in FIG. 1 is of 2 pieces. An integral antenna element structure 2 made of a single piece of material mounted to a substrate 3. Allowing for a cheap and rapid assembly and manufacturing of the antenna array 1. In detail, the antenna elements, the antenna ground plane 4 and the transition pin all form a common integral piece that is mounted to the substrate 3, thus having an antenna array 1 with a low amount of components.

FIG. 1 illustrates 3 adjacent antenna elements 7. The reference sign ‘A’ in FIG. 1 illustrates an antenna element 7 with a first body 9 and an adjacent second body 10. As further seen in FIG. 1, the antenna element 7 ‘A’ is adjacent to an antenna element 7 ‘B’, where the first body 9 of the antenna element 7 ‘A’ forms a common tapered structure 19 with the second body 10 of the antenna element 7 'B'. The common tapered structure 19 forming an arrow-like structure.

As shown in FIG. 1, the radiation slot 13 of each antenna element is positioned on the upper portion 12 of the antenna elements 7 and defined by a tapered (from the upper portion 12 towards the lower portion 11) gap in-between the first body 9 and the second body 10 of an antenna element 7. Each radiation slot 13 forms a V-shape in FIG. 1. However, the radiation slot 13 may have any other suitable shape. Accordingly, the radiation slot 13 may be continuously tapering (as illustrated) or be stepwise tapering (not shown). In FIG. 1, the radiation slot 13 is an air-filled slot, however according to some embodiments, the radiation slot 13 may be filled with a dielectric.

As further shown in FIG. 1, the transition pin 17 extends from the first leg end 15' of each antenna element 7. The transition pin 17 may be a coaxial center pin arranged to feed each antenna element 7. The transition pin 17 in FIG. 1, feeds the antenna element 7 orthogonally from below the antenna element 7. However, other feeding arrangements are also viable. The first leg end 15' and the second leg end 16' in FIG. 1 have differing distances from the first surface 5 of the antenna ground plane 4. However, according to some embodiments, the first leg end 15' and the second leg end 16' have the same distance to the first side 5. The transition pin 17 replaces the need for a connector in the antenna array 1, allowing for a significantly simplified and cheaper assembly. The transition pin 17 may extend to the second surface 6 of the substrate 3 or it may extend longer than the second surface 6 of the substrate 3 so it protrudes from the second surface 6 of the substrate 3. The substrate 3 may comprise electrical circuitry to feed the antenna elements 7 through each transition pin 17. By having the transition pins 17 integral with the antenna elements 7, the antenna array 1 forms a compact structure. As seen in FIG. 1, there is no auxiliary component intermediate the substrate 3 and the antenna ground plane 4.

Figure 2:
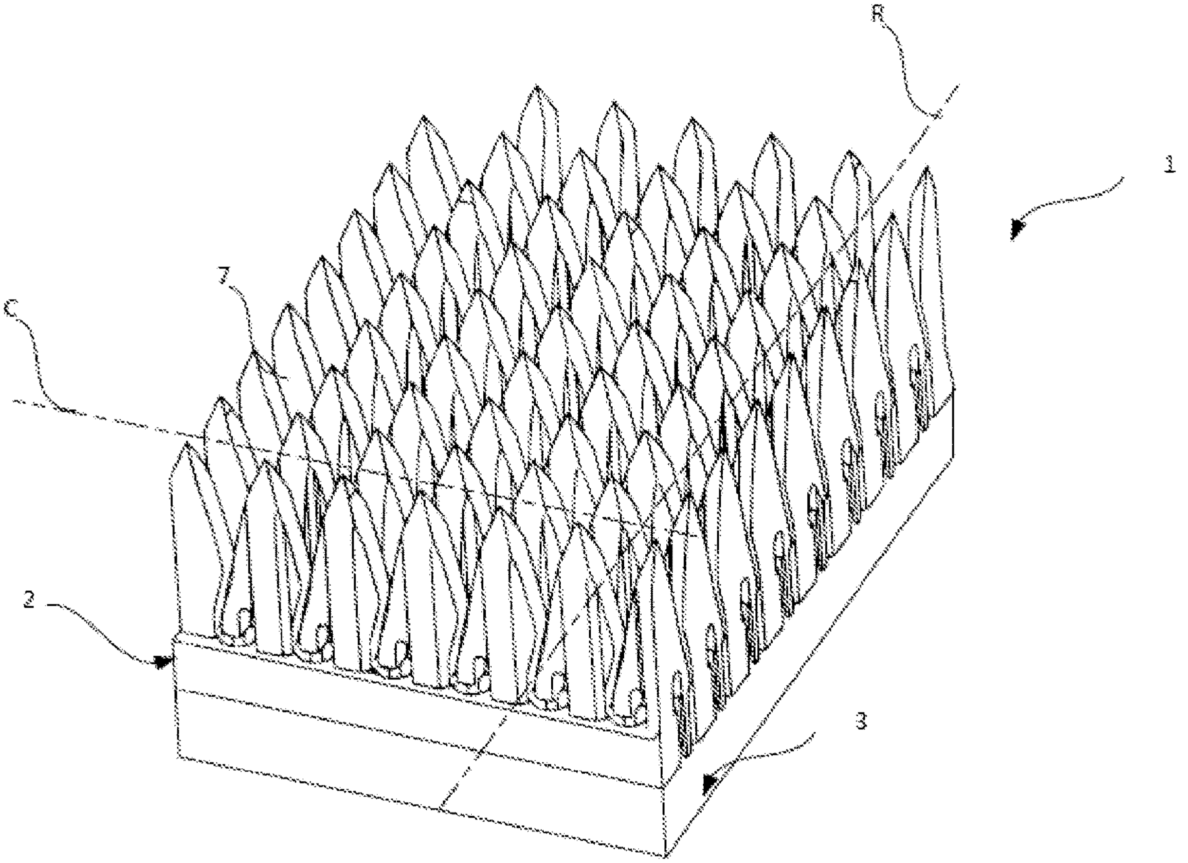
FIG. 2 depicts an objective view of an antenna array in accordance with an embodiment of the present disclosure.

FIG. 2 illustrates an objective view of an antenna array 1. As seen in FIG. 2, the antenna elements 7 are arranged in a plurality of rows R and a plurality of columns C. It is further seen in FIG. 2 that the antenna element structure 2 is a one-piece integral structure that is mounted on the substrate 3.

Figure 3:
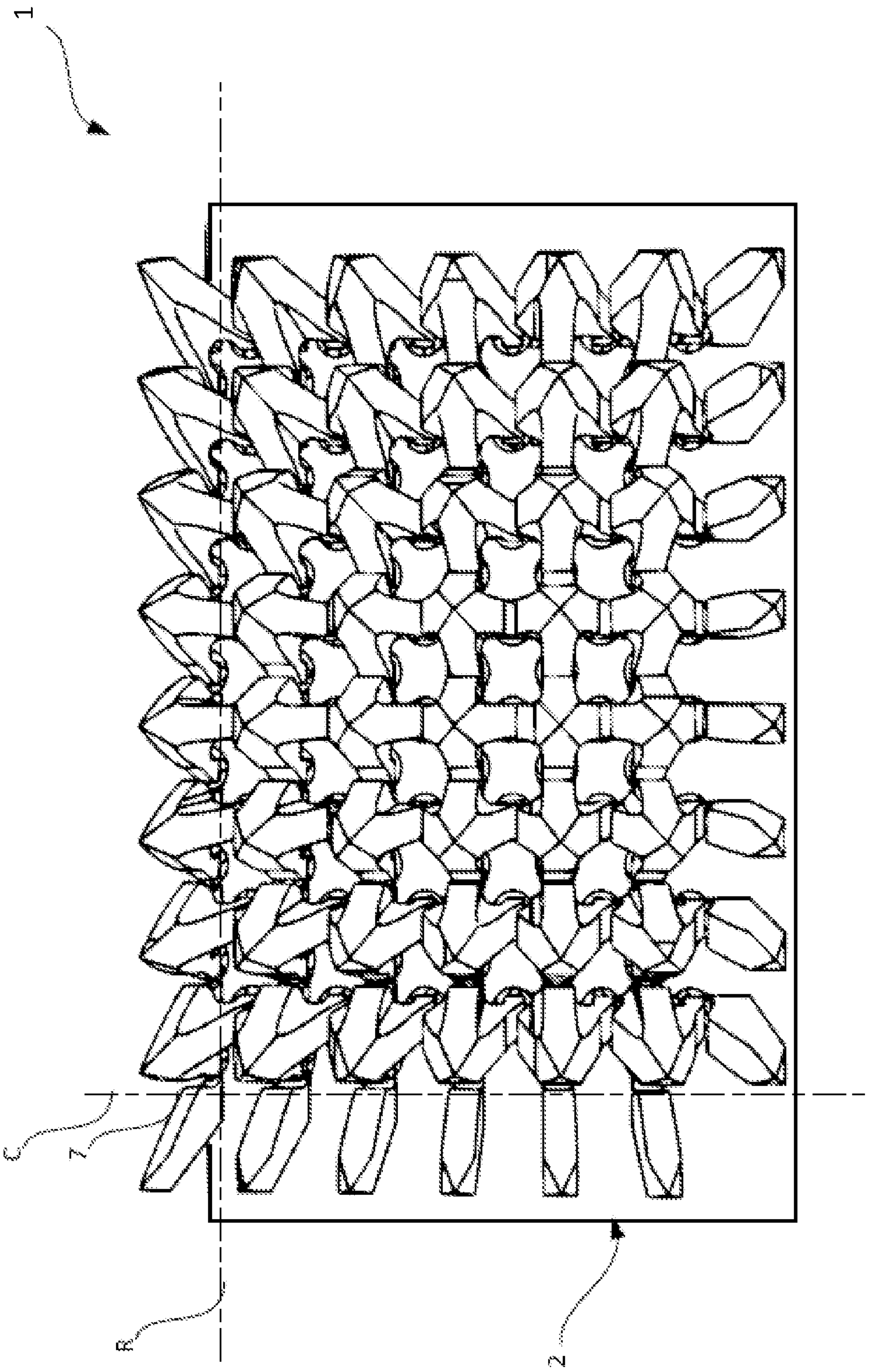
FIG. 3 depicts a top view of an antenna array in accordance with an embodiment of the present disclosure.

FIGS. 2 and 3 show that the first body and the second body of a common tapered structure 19 (as shown in FIG. 1) of the first set of elements 7 is perpendicularly conjoined with a corresponding common tapered structure 19 of the second set of elements 7 such that a common tapered structure 19 of the first set of elements 7 and a corresponding common tapered structure 19 of the second set of elements 7 form a cross. Accordingly, the first set of elements 7 refers to the elements forming a row R in the antenna array 1, and the second set of elements 7 refers to the elements forming a column, M in the antenna array 1.

FIG. 3 shows a top view of the antenna array 1 where there is shown that the antenna elements 7 form a grid-like structure on the first surface 5 of the antenna ground plane 4. Accordingly, each 'cross'-shape comprises a two perpendicularly joined common tapered structures 19 (common tapered structures are shown in FIG. 1).

Figure 4:
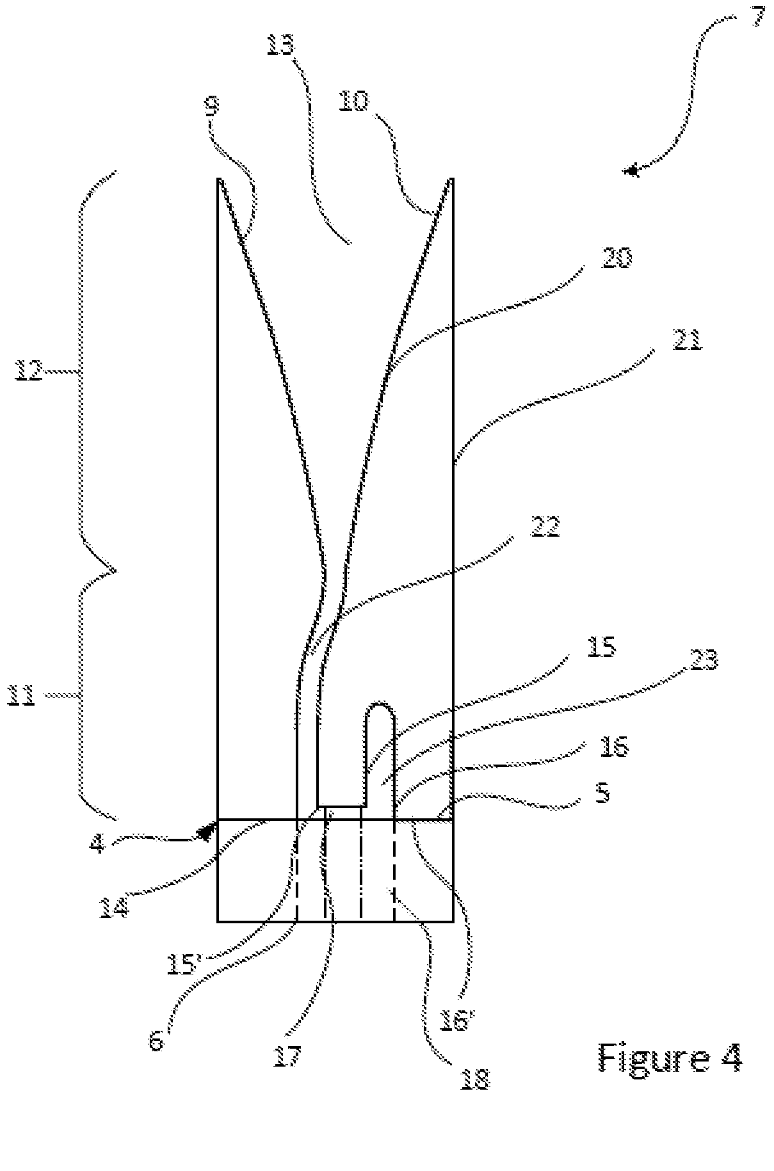
FIG. 4 depicts a side view of antenna element in accordance with an embodiment of the present disclosure.

FIG. 4 illustrates a side-view of a single antenna element 7, such as a cut-out of the antenna element 7 denoted 'A' in FIG. 1. As shown in FIG. 4, the transition pin extends from the first leg end 15' to the second surface 5 of the antenna ground plane 4. Further, the first body 9 and the second body 10 comprises an inner portion 20 and an outer portion 21, the outer portion 21 extending vertically. As seen in FIG. 4, the outer portion 21 of each antenna element 7 extends perpendicular to the first surface 5 of the antenna ground plane 4. Further, the upper portion 12 of the inner portion 20 of the first and the second body 9, 10 extends in a tapered manner. However, inner portion 20 of the lower portion 11 of the first body 9, extends from the first surface 5 of the antenna ground plane 4 in a flared manner towards the upper portion 12. Accordingly, the inner portion 20 of the lower portion 11 of the second body 10 extends mirrored compared to the inner portion 20 of the first body 9 i.e. in an inwardly curved manner.

As shown in FIG. 4, the transition pin 17 extends into a passage 18. The passage 18 is located within the ground plane 4, extending from the first surface 5 to the second surface 6, allowing the transition pin 17 to extend such that it is arranged to be fed from the substrate 3.

Further, it is shown in FIG. 4 that the radiation-slot 13 extends into a sinuous portion 22 towards the first surface 5 of the antenna ground 4 plane. The shape of the sinuous portion 22 is defined by the distance in-between the first body 9 and the second body 10 of an antenna element 7 and the form of the inner portion 21 of the first body 9 and the second body 10 of the antenna element 7. The sinuous portion is position within the lower portion 11 of the antenna element 7 and extends up to form the radiating slot 13 in the upper portion 12 of the antenna element 7. As illustrated in FIG. 4, the sinuous portion 22 extends into said passage 18. However, according to some embodiments, the sinuous portion 22 only extend to the first surface 5 of the antenna ground plane 4.

Furthermore, a cavity 23 is formed intermediate the first leg 15 and the second leg 16 of the second body 10. The cavity 23 may be arbitrarily shaped. Further, as shown in FIG. 4, the cavity 23 may extend into the passage 18. The cavity is defined by the form of the first leg 15 and the second leg 16 and the distance in-between the first leg 15 and the second leg 16 of the second body 10.

Figure 5:
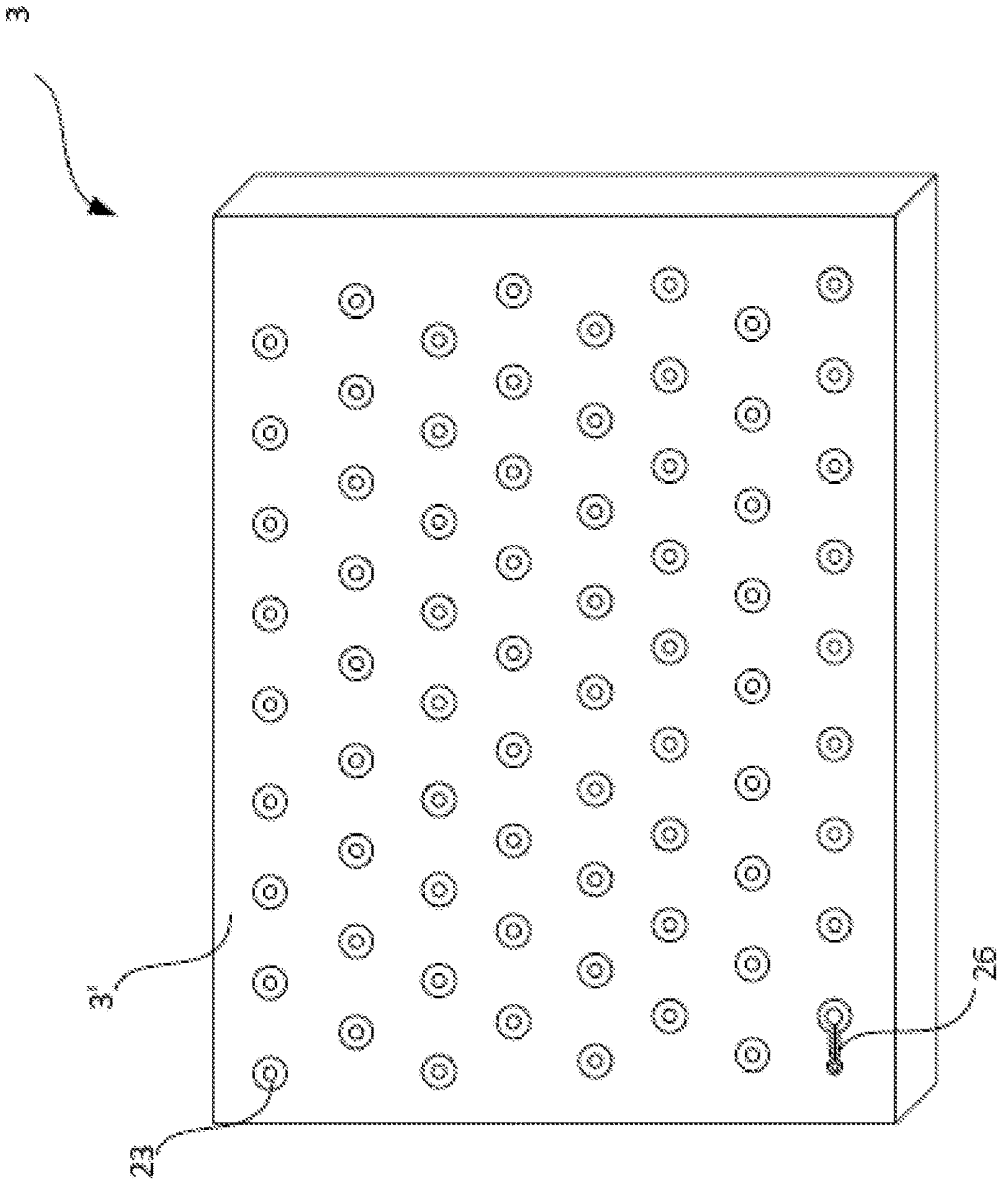
FIG. 5 depicts a view of the first side of a substrate in accordance with an embodiment of the present disclosure.

FIG. 5 illustrates the first side 3' of a substrate 3. The substrate 3 may comprise an electrically conductive pattern (not shown), wherein a first surface 3' of the substrate comprises a plurality of feeding pads 23, each feeding pad 23 being arranged to feed a corresponding transition pin 17. The substrate 3 comprises at least one vertical interconnect access, via (not shown) arranged to transfer a signal to the feeding pad 23 from a layer below the first surface 3' of the substrate 3. Thus, the substrate 3 may have a plurality of signal layers with electrically conductive patterns. The via may be connected to the middle of the feeding pad 23 to a below layer. The term "via" refers to two pads in corresponding positions on different layers of the substrate 3 that are electrically connected by a hole through the substrate 3. Thus, each feeding pad 23, may be connected to a corresponding additional pad (not shown), wherein the additional pad is positioned in another layer of the substrate below the first surface 3'. The feeding pads 23 and each additional pad may be connected by a hole that is made conductive by electroplating, the hole may be positioned in the middle of the feeding pad 23. The via in the substrate may be of different types, such as a through hole via, a blind via, a buried via or any other type of via.

Further, as shown in FIG. 5, the feeding pads 23 may be connected to a micro-strip 26 that moves the via connected to another layer of the substrate 3 away from the feeding pad 23. Thus, the via may extend from the end of the micro-strip 26 to another layer of the substrate 3.

The substrate 3 as shown in FIGS. 1, 2, 5 and 6 may be a printed circuit board, PCB. Accordingly, the PCB may be an interconnect between the antenna elements 7 and the electronics.

Figure 6:
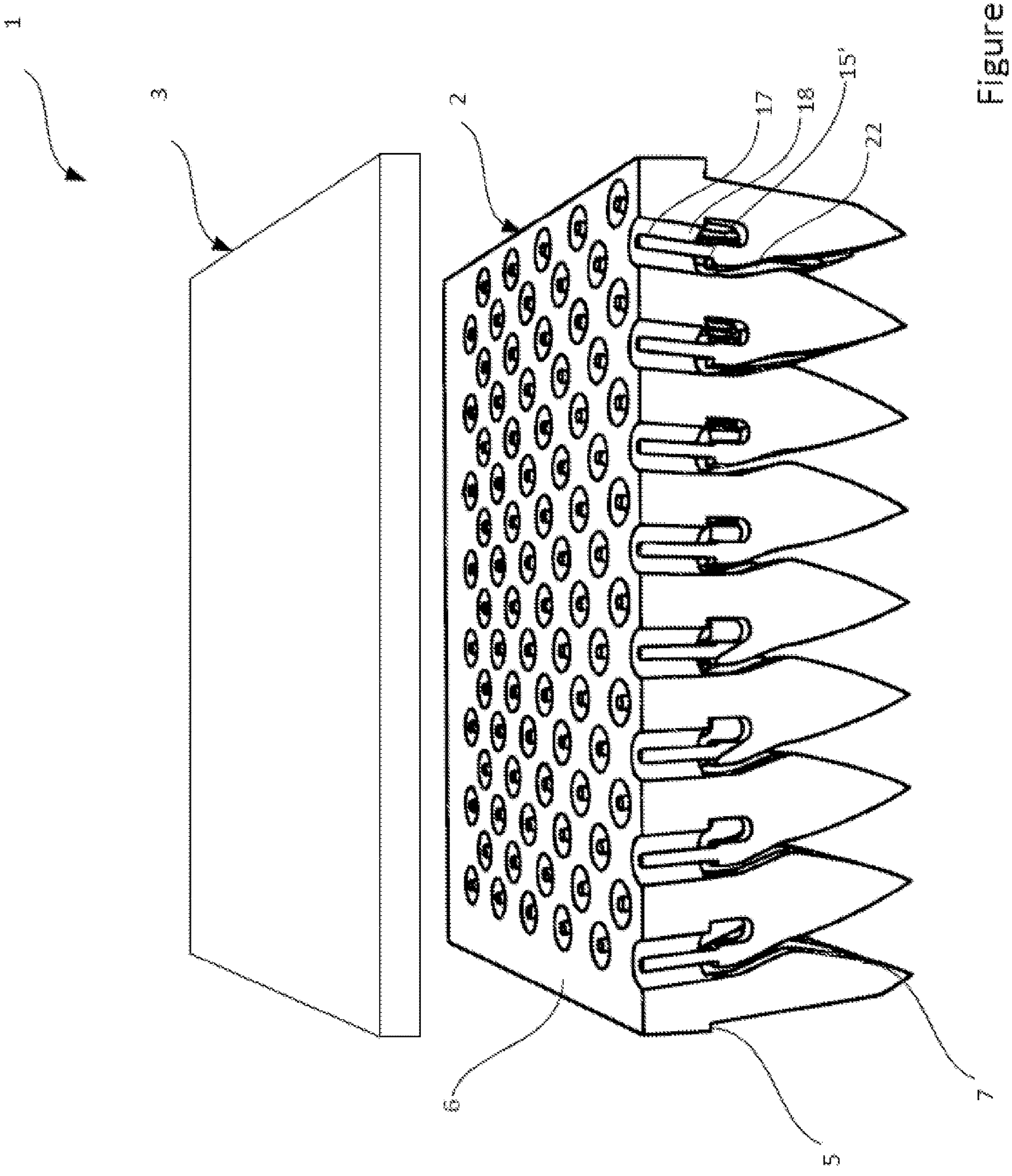
FIG. 6 depicts an objective view of an exploded antenna array in accordance with an embodiment of the present disclosure where the antenna element structure and the substrate are viewed from the bottom.

FIG. 6 illustrates an exploded view of an antenna array 1. The integral antenna element structure 2 is viewed from the second surface 6 of the antenna ground plane 4. It is shown in FIG. 6 that the sinuous portion 22 of each antenna element 7 extends into the passage 18 of the antenna element structure 2, with this design the manufacturing is simplified and faster. Further, it is shown in FIG. 6 that the transition pin 17 extends from the first leg end 15' to the second surface 6 of the antenna ground plane 4. Each transition pin 17 is arranged to be coupled to a corresponding feeding pad 23 (see FIG. 5). The feeding pad 23 may protrude from the first surface 3' of the substrate 3 such that it partially extends into the passage 18 of the antenna ground plane 4, allowing for a shorter transition pin 17 than shown in FIG. 6. However, the transition pin 17 may be longer than shown in FIG. 6.

As further shown in FIG. 6, the passage 18 may circumferentially enclose the transition pin 17. This, results in a more compact antenna array 1 structure and also less risk of the transition pin 17 being damaged.

The antenna array 1 as disclosed herein may be configured to transmit and receive wireless signals at a frequency in the range of 21 GHz and 50 GHz. The antenna array 1 as disclosed herein having an integral antenna element structure 2 mounted to a substrate 3 may beneficially transmit and receive wireless signals at a frequency range of 21 GHz and 50 GHz since there is no need for a connector that limits the inter-element spacing of the antenna array 7 or that increases the price of the antenna array 1.

The antenna array 1 may have half-wavelength separation between adjacent antenna elements 7 in each row/column. Further, the antenna array 1 may be a dual-polarized antenna array 1.

The integral antenna element structure 2 may be a metal structure. This combined with the integral design of the antenna element structure 2 may provide the benefit of the integral antenna element structure 2 drawing excess heat from the substrate 3.

Figure 7:
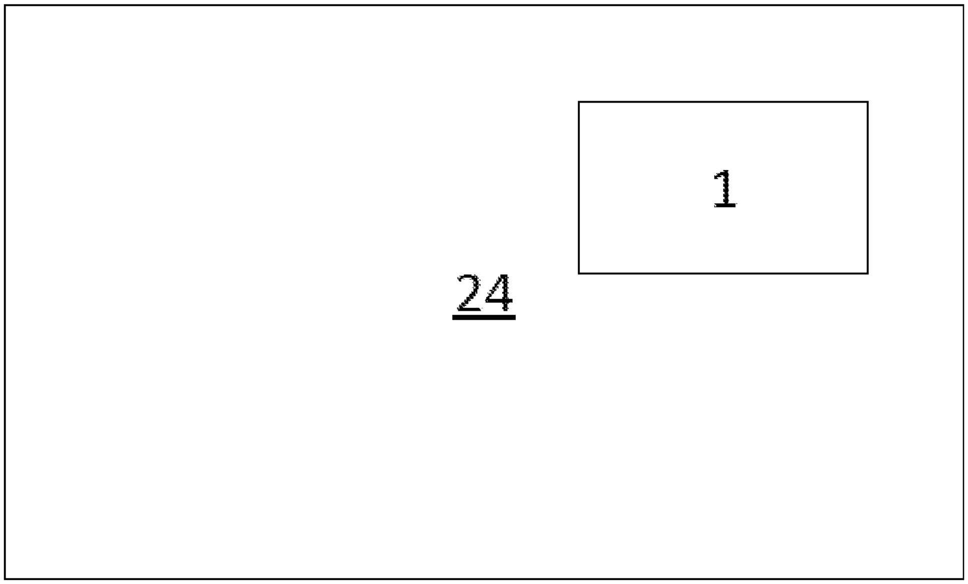
FIG. 7 schematically depicts a vehicle comprising the antenna array in accordance with an embodiment of the present disclosure.

FIG. 7 schematically illustrates a vehicle 24 comprising the antenna array 1 as disclosed herein. The vehicle 24 may be an aircraft, a vessel or a ground vehicle.

Figure 8:
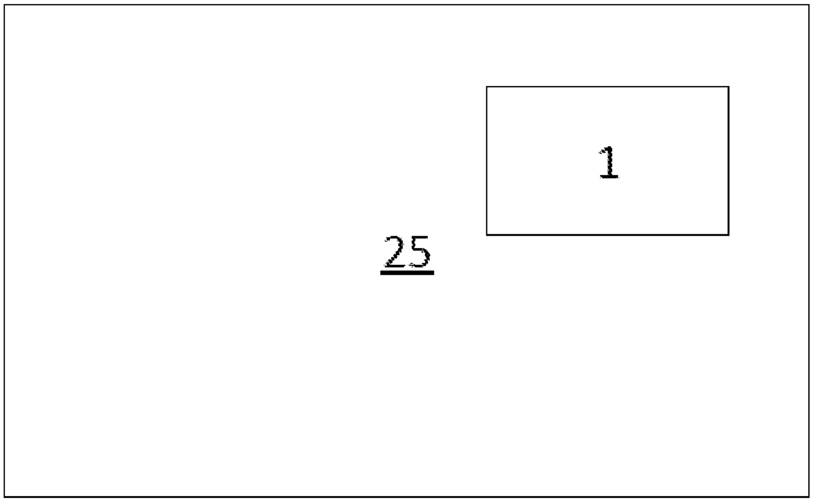
FIG. 8 schematically depicts a base station comprising the antenna array in accordance with an embodiment of the present disclosure.

FIG. 8 schematically illustrates a base station 25 comprising the antenna array 1.

According to some embodiments, the antenna array 1 is arranged in a radar system.

Figure 9:
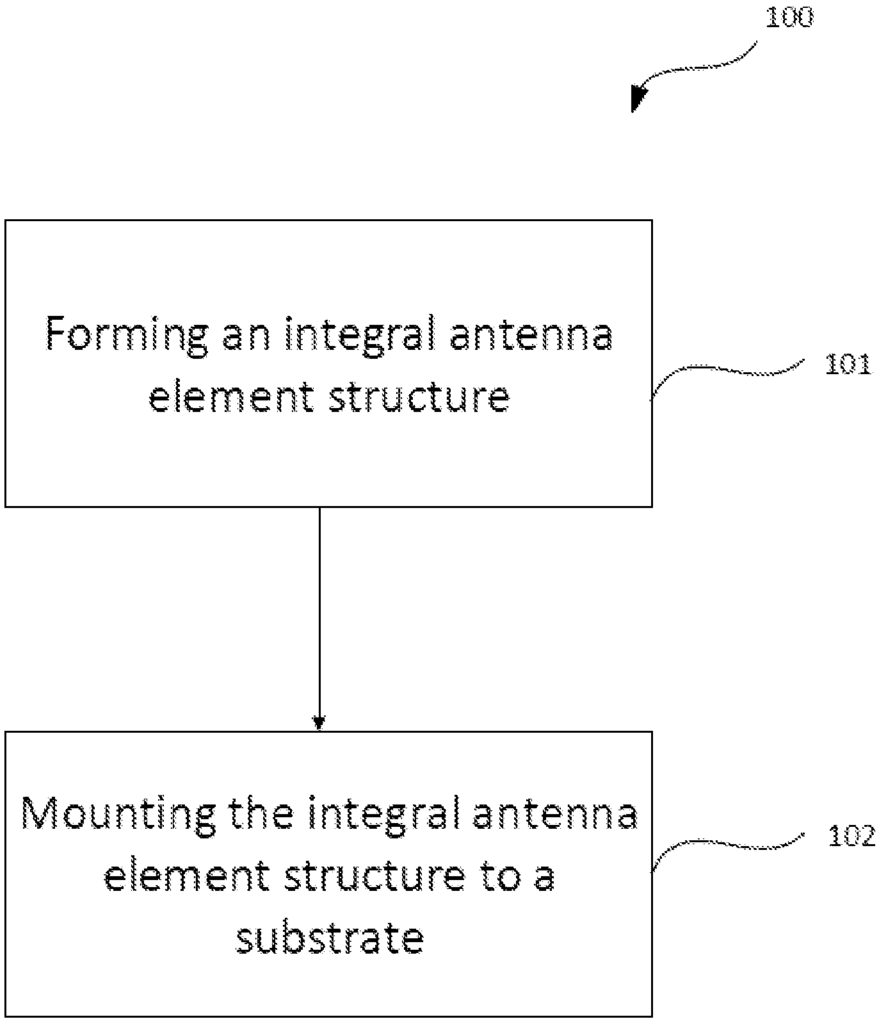
FIG. 9 depicts a flow chart of a method of manufacturing an antenna array in accordance with an embodiment of the present disclosure.

FIG. 9 illustrates a flow chart of a method 100 of manufacturing an antenna array. The method 100 comprises two steps, a first step of:

Forming 101 an integral antenna element structure comprising an antenna ground plane having first and second opposing surfaces a first set of antenna elements arranged in at least a first and a second row, and a second set of antenna elements arranged in at least a first and a second column. The antenna elements extending vertically from said first surface each antenna element comprising a first body and an adjacent second body extending from a lower portion to a tapered upper portion, forming a radiation-slot intermediate the tapered upper portion of the first and the second body wherein a first end of the lower portion of the first body form a common integral part with the first surface of the antenna ground plane.

Further, the lower portion of the second body is branched into a first leg and a second leg having a first leg end and a second leg end, wherein a transition pin forms an integral part with said first leg, extending from said first leg end at least partly through a passage in said ground plane, the second leg end being integral with the first surface of the antenna ground plane. The first set of antenna elements are arranged such that the first body and the second body of each adjacent antenna element form a common tapered structure and the second set of antenna elements are arranged such that the first body and the second body of each adjacent antenna element form a common tapered structure.

The method 100 further comprises a second step of:

Mounting 102 the integral antenna element structure to a substrate.

The integral antenna element structure 2 may be formed by machining or additive manufacturing. Thus, a single manufacturing equipment such as a milling machine for machining or a 3D printer for additive manufacturing may form the integral antenna element structure 2. Resulting in a cheap and fast manufacturing of the antenna element structure 2. Further, the design of the antenna element structure 2 may beneficially be modified (for instance to adapt it to a PCB) since 3D model data and material supply may be the only requirement for the manufacturing of the integral antenna element structure 2. Further, the integral antenna element 2 may be mounted on said substrate 3 by soldering, glue, screws or any other suitable method.

The invention claimed is:

1. An antenna array comprising:

an integral antenna element structure mounted on a substrate;

the integral antenna element structure comprising:

an antenna ground plane having first and second opposing surfaces;

a first set of antenna elements arranged in at least a first and a second row, and a second set of antenna elements arranged in at least a first and a second column, said antenna elements extending vertically from said first surface;

each antenna element comprising a first body and an adjacent second body extending from a lower portion to a tapered upper portion, forming a radiation-slot intermediate the tapered upper portion of the first and the second body;

wherein a first end of the lower portion of the first body forms a common integral part with the first surface of the antenna ground plane, wherein the lower portion of the second body is branched into a first leg having a first leg end and a second leg having a a second leg end;

wherein a transition pin forms an integral part with said first leg, extending from said first leg end at least partly through a passage in said ground plane, the second leg end being integral with the first surface of the antenna ground plane;

wherein the first set of antenna elements are arranged such that the first body and the second body of each adjacent antenna element form a common tapered structure; and wherein the second set of antenna elements are arranged such that the first body and the second body of each adjacent antenna element form a common tapered structure, wherein the radiation slot extends into a sinuous portion towards the first surface of the antenna ground plane.

2. The antenna array according to claim 1, wherein the first body and the second body of a common tapered structure of the first set of elements is perpendicularly conjoined with a corresponding common tapered structure of the second set of elements such that a common tapered structure of the first set of elements and a corresponding common tapered structure of the second set of elements form a cross, such that the antenna elements form a grid-like structure on said first surface.

3. The antenna array according to claim 1, wherein the first body and the second body comprises an inner portion and an outer portion, the outer portion extending vertically.

4. The antenna array according to claim 1, wherein the sinuous portion extends into said passage.

5. The antenna array according to claim 1, wherein a cavity is formed intermediate the first leg and the second leg of the second body.

6. The antenna array according to claim 1, wherein the substrate comprises an electrically conductive pattern, wherein a first surface of said substrate comprises a plurality of feeding pads, each feeding pad being arranged to feed a corresponding transition pin.

7. The antenna array according to claim 6, wherein the substrate comprises at least one vertical interconnect access, via arranged to transfer a signal to the feeding pad from a layer below the first surface of the substrate.

8. The antenna array according to claim 1, wherein the substrate is a printed circuit board, PCB.

9. The antenna array according to claim 1, wherein the antenna array is configured to transmit and receive wireless signals at a frequency in the range of 21 GHz and 50 GHz.

10. The antenna array according to claim 1, wherein the integral antenna element structure is a metal structure.

11. The antenna array according to claim 1, wherein the passage circumferentially encloses the transition pin.

12. A vehicle comprising the antenna array according to claim 1.

13. A base station comprising the antenna array according to claim 1.

14. A method for manufacturing an antenna array comprising the steps of:

forming an integral antenna element structure comprising:

an antenna ground plane having first and second opposing surfaces;

a first set of antenna elements arranged in at least a first and a second row, and a second set of antenna elements arranged in at least a first and a second column, said antenna elements extending vertically from said first surface;

each antenna element comprising a first body and an adjacent second body extending from a lower portion to a tapered upper portion, forming a radiation slot intermediate the tapered upper portion of the first and the second body, wherein the radiation slot extends into a sinuous portion towards the first surface of the antenna ground plane;

wherein a first end of the lower portion of the first body form a common integral part with the first surface of the antenna ground plane, wherein the lower portion of the second body is branched into a first leg having a first leg end and a second leg having a a second leg end, wherein a transition pin forms an integral part with said first leg, extending from said first leg end at least partly through a passage in said ground plane, the second leg end being integral with the first surface of the antenna ground plane;

wherein the first set of antenna elements are arranged such that the first body and the second body of each adjacent antenna element form a common tapered structure, wherein the second set of antenna elements are arranged such that the first body and the second body of each adjacent antenna element form a common tapered structure; and mounting the integral antenna element structure to a substrate.

15. The method according to claim 14, wherein the integral antenna element structure is formed by additive manufacturing or machining.

16. The method according to claim 15, wherein the integral antenna element is mounted on said substrate by soldering, glue or screws.

* * * * *